United States Patent
Mixter et al.

(10) Patent No.: US 11,475,311 B2
(45) Date of Patent: Oct. 18, 2022

(54) NEURAL NETWORK INSTRUCTION STREAMING

(71) Applicant: Raytheon Company, Waltham, MA (US)

(72) Inventors: John E. Mixter, Tucson, AZ (US); David R. Mucha, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 414 days.

(21) Appl. No.: 16/668,957

(22) Filed: Oct. 30, 2019

(65) Prior Publication Data

US 2021/0133579 A1    May 6, 2021

(51) Int. Cl.
| | | |
|---|---|---|
| *G06N 3/08* | (2006.01) | |
| *G06F 9/38* | (2018.01) | |
| *G06N 3/04* | (2006.01) | |

(52) U.S. Cl.
CPC .......... *G06N 3/084* (2013.01); *G06F 9/3851* (2013.01); *G06N 3/04* (2013.01)

(58) Field of Classification Search
CPC ..... G06F 9/30003; G06F 9/3851; G06N 3/04; G06N 3/084
See application file for complete search history.

(56) References Cited

U.S. PATENT DOCUMENTS

| | | |
|---|---|---|
| 5,325,464 A | 6/1994 | Pechanek et al. |
| 2019/0087708 A1 | 3/2019 | Goulding et al. |
| 2019/0147342 A1 | 5/2019 | Goulding et al. |
| 2019/0236009 A1* | 8/2019 | Burger ............... G06F 9/383 |

FOREIGN PATENT DOCUMENTS

| | | |
|---|---|---|
| EP | 3709224 | 9/2020 |
| WO | 2019085655 | 5/2019 |
| WO | WO-2021086486 A1 | 5/2021 |

OTHER PUBLICATIONS

Fowers, Jeremy, et al. "A configurable cloud-scale DNN processor for real-time AI." 2018 ACM/IEEE 45th Annual International Symposium on Computer Architecture (ISCA). IEEE, 2018 (Year: 2018).*

Liu, Shaoli, et al. "Cambricon: An instruction set architecture for neural networks." 2016 ACM/IEEE 43rd Annual International Symposium on Computer Architecture (ISCA). IEEE, 2016. (Year: 2016).*

Moreau, Thierry, et al. "SNNAP: Approximate computing on programmable SoCs via neural acceleration." 2015 IEEE 21st International Symposium on High Performance Computer Architecture (HPCA). IEEE, 2015. (Year: 2015).*

(Continued)

*Primary Examiner* — Benjamin P Geib

(74) *Attorney, Agent, or Firm* — Schwegman Lundberg & Woessner, P.A.

(57) ABSTRACT

An artificial neural network is implemented via an instruction stream. A header of the instruction stream and a format for instructions in the instruction stream are defined. The format includes an opcode, an address, and data. The instruction stream is created using the header, the opcode, the address, and the data. The artificial neural network is implemented by providing the instruction stream to a computer processor for execution of the instruction stream.

17 Claims, 9 Drawing Sheets

(56) References Cited

OTHER PUBLICATIONS

Esmaeilzadeh, Hadi, et al. "Neural acceleration for general-purpose approximate programs." 2012 45th Annual IEEE/ACM International Symposium on Microarchitecture. IEEE, 2012. (Year: 2012).*
Esmaeilzadeh, Hadi, et al. "NnSP: embedded neural networks stream processor." 48th Midwest Symposium on Circuits and Systems, 2005 . . . IEEE, 2005. (Year: 2005).*
"International Application Serial No. PCT US2020 048465, International Search Report dated Dec. 11, 2020", 5 pgs.
"International Application Serial No. PCT US2020 048465, Written Opinion dated Dec. 11, 2020", 5 pgs.
"International Application Serial No. PCT/US2020/048465, International Preliminary Report on Patentability dated May 12, 2022", 7 pgs.

\* cited by examiner

NEURAL NETWORK INSTRUCTION STREAMING

TECHNICAL FIELD

Embodiments described herein generally relate to a system and method for implementing an artificial neural network via an instruction stream.

BACKGROUND

Artificial neural networks consist of many layers. These layers, regardless of type, can be thought of as just connections and weights. Each layer has an input from a previous layer or connection and a weight associated with that input. Layer types only differ in how the outputs of one layer are connected to the inputs of the next layer.

Artificial neural networks can be trained to implement artificially intelligent processes and functions that can infer and/or predict many things. Neural network training and inference can be distilled down to simple multiply and accumulation operations. During inference, also known as forward propagation, the sums of the multiply and accumulate operations are fed into activation functions that inject nonlinearity into the network. During training, also known as back propagation, the derivative of the activation functions along with the multiply and accumulate sums are used to determine the perceptron output error. It is this error that is used to adjust perceptron input weights allowing the network to be trained.

Before neural networks can be used for predictions, the networks must be installed on a hardware platform. A difficulty in installing an artificial neural network on a hardware platform is the substantial amount of research required regarding the hardware on which the neural networks are installed because neural networks are large and use a lot of resources.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

The present disclosure relates to installing an artificial network into hardware, and an embodiment takes a different approach to address the difficulty of the vast amount of research, hardware, and other resources that it takes to implement an artificial neural network. To this end, an embodiment turns an artificial neural network into an instruction stream. Because there is no real processing difference between the neural network layer types, a very simple set of instruction opcodes can be created to execute any of the standard neural network architectures. In this embodiment, the hardware acts as a simple processor that takes in the instructions in the instruction stream and performs the multiplication and accumulation upon which a neural network is based. Simply put, the embodiment deconstructs a neural network into an instruction stream that can be executed in the hardware. In a further embodiment, the instruction stream is divided into multiple streams and the multiple streams are executed in parallel. This exploitation of the natural parallelism of a neural network permits such neural networks to run in a constrained hardware environment.

A first step in creating the instruction stream is to analyze the neural network itself. Specifically, the neural network is separated into its layers. All the multiplies and accumulates that execute in a particular layer can all be computed at the same time. That is, the multiplies and accumulates are data independent. Therefore, once a layer receives its input from the previous layer, all the different perceptrons in that layer can execute in parallel. This parallelism is mirrored in the creation of the instruction streams. That is, the layers of the neural network are separated, and then the perceptrons that can be grouped together are identified. In other words, instead of executing one perceptron at a time, the perceptrons are separated into groups. This grouping depends on the available hardware.

Figure 1:
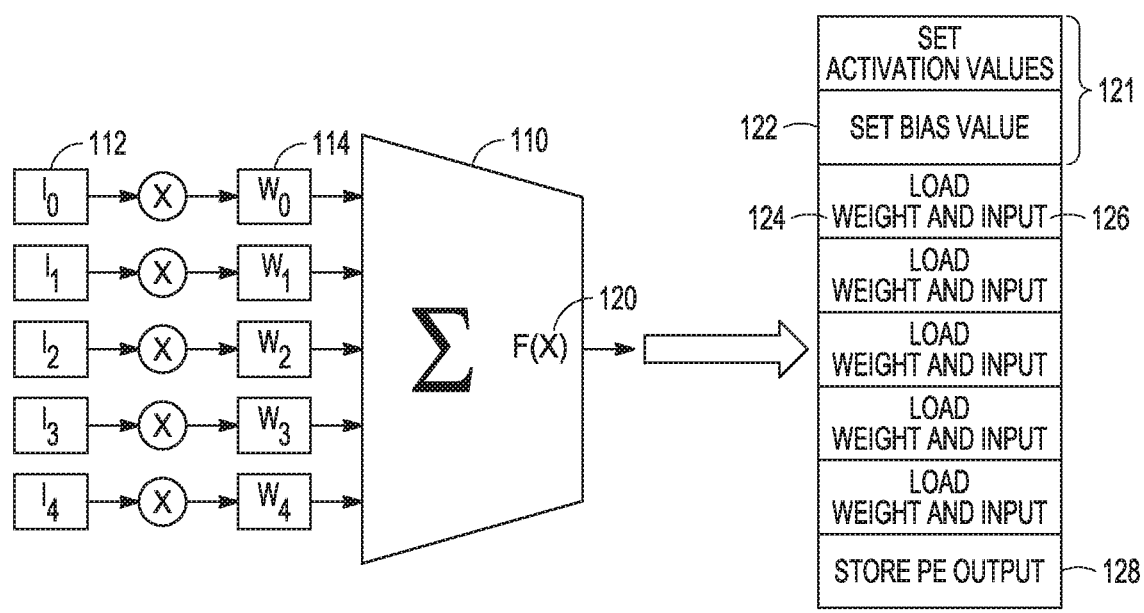
FIG. 1 is a block diagram illustrating an implementation of an artificial neural network via an instruction stream.

FIG. 1 illustrates how a single instruction stream is assembled. Referring to FIG. 1, an embodiment includes a perceptron 110. The perceptron 110 receives input 112 and these inputs are multiplied by weights 114. The results of these multiplications are summed/accumulated and then applied to an activation function 120. This generates the output, and the output is converted to its instruction equivalent. Specifically, the instruction includes a header 121 that sets some activation values, a bias value 122 is set, and then one after another the weights 124 and inputs 126 are loaded. It is noted that the inputs 112 and weights 114 correspond to the loaded weights 124 and inputs 126. While only five weight and input pairs are illustrated in FIG. 1, in practice, that are thousands in a real model. Once all the weights and inputs have been turned into an instruction, the multiply and accumulate are executed, and the resulting output is stored in memory on the hardware device. It is noted that the activation function is stored in the header, because the activation function is fixed and does not change. In contrast, the weights and the addresses of the inputs are different values as one goes down the stream. A processing element executes the instruction stream by multiplying the inputs by the weights and accumulating the results, and as indicated at 128, the output of the processing element is stored in memory.

Figure 2:
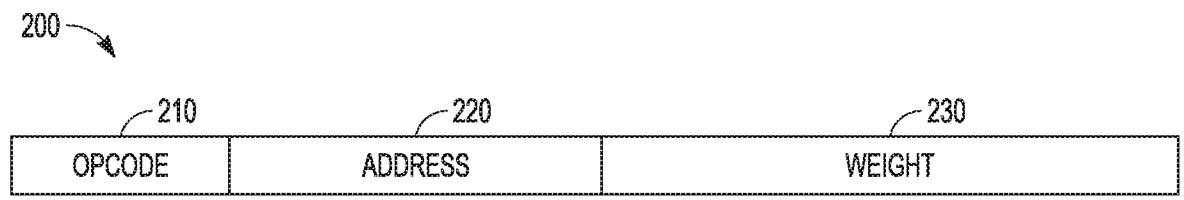
FIG. 2 is an illustration of an instruction format for implementing an artificial neural network.

FIG. 2 illustrates an embodiment of an instruction 200, which can be 64 bits long. A first part of the instruction is an op code 210, which determines what that instruction does. In a sense, the op code informs where in the neural network the execution is, which informs the processing engine what it needs to do. In an embodiment, the op code is eight bits long. The opcode sets the layer types. The different types of layers include an input, a fully connected convolution, a single or multiple map convolution, a pooling layer, or a classifier. As is known to those of skill in the art, a two-dimensional convolution layer is a common layer within a network, and it has different connection patterns and it recycles weights. A benefit of a convolution layer is it uses very few weights; however, it does take a lot of calculations. The instructions point to a different pattern of inputs from the previous layer. The op code changes to tell the processing element what the function of the instruction is and for what purpose the data will be used. The instruction could also relate to load, store, map done (indicates when a convolution is done), or set value (used to set register values with constants) functions to be executed by the processing element.

The next bits in the instruction 200 inform the processing element of address locations 220, that is, either where to find data or where to put data. In an embodiment, the address 220 is sixteen bits long. For example, if it is a LOAD instruction, these bits will inform from where to load the data. That is, the previous layer stored its data in memory, and the LOAD instruction tells the processing element where to get that data in order to start the multiplication process for the current perceptron.

Figure 3:
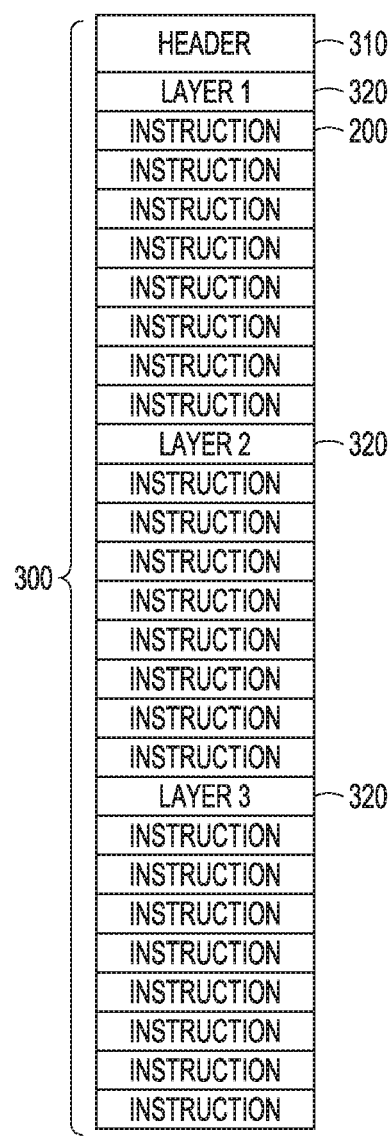
FIG. 3 is an illustration of an instruction stream for implementing an artificial neural network.

The next value in the instruction 200 is the actual weight value 230 to be applied to the input. For example, if the instruction was a LOAD instruction, the instruction would cause the loading of the input, the weight would be obtained, and then the multiplication would be executed. The last 32 bits are also used during back propagation to inform from where to get information or where to store information. As illustrated in FIG. 3, the instructions 200 are commingled into the instruction stream 300, which consists of a header 310 and a plurality of layers 320 and associated instructions 200. The layers 320 correspond to the multiple layers in the artificial neural network.

Figure 4:
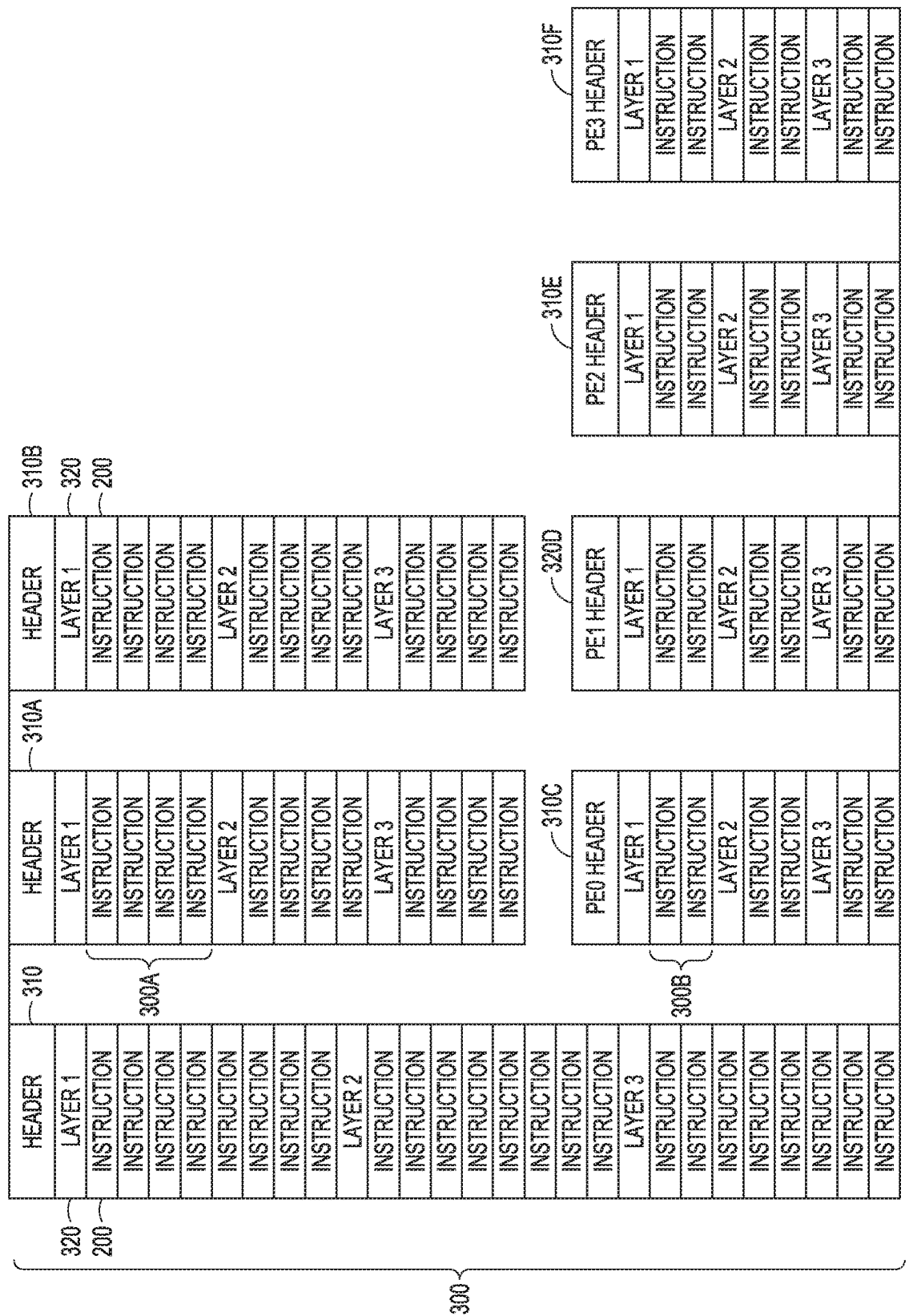
FIG. 4 is an illustration of an instruction stream for implementing an artificial neural network that has been divided into several instruction streams.

FIG. 4 illustrates an example of how an instruction stream can be divided up. Given the size of the hardware on hand, the system can have several processing elements within that hardware. Each one of the divided-up instruction streams has a header, a layer identification, and then some instructions, followed by another layer and some more instructions. Specifically, as illustrated in FIG. 4, there is a single instruction stream 300 with three layers 320, and many instructions 200 between the layers. As further illustrated in FIG. 4, one layer can be divided into four instructions 300A for two processing elements 310A and 310B, or two instructions 300B for four processing elements 310C, 310D, 310E, and 310F. This division of the instruction stream into many processing elements reduces the amount of time that it takes to execute that instruction stream. Each layer 320 must finish before proceeding onto the next layer. If the instructions do not divide out equally, then the processing element that has fewer instructions waits for the other processing elements to finish their execution before it goes on to the next layer, because the next layer needs all the data from the previous layer.

As noted above, the implementation and use of artificial neural networks involves forward and backward propagation. In an embodiment, the forward propagation instruction stream begins with the header 310. The header contains global information needed to execute the artificial neural network. Global information includes learning rates, activation functions, and other hyper parameters. Next, as alluded to above, to execute the function of a perceptron, input values, weight values, and destinations for the resulting sums are needed. LOAD opcodes are used to retrieve input data and weight values, and STORE opcodes are used to place sums in the proper memory destinations.

In one embodiment, the input and output values are located in the memory of a field programmable gate array (FPGA). The FPGA processing element must be provided with the FPGA memory address for each neuron value when the FPGA processing element receives the LOAD instruction. Because of FPGA internal memory limitations, the weights are stored in memory. Consequently, the value of the weight must be provided to the FPGA processing element on the same LOAD opcode. During the execution of a STORE opcode, the destination address for the resulting sum is transmitted to the FPGA processing element. The STORE opcode occurs once for each perceptron and marks the end of a multiply and accumulate operation. In most embodiments, the LOAD and STORE opcodes makeup the bulk of the instruction stream.

In back propagation, the instruction stream is reversed. Starting with the classifier layer whose outputs were just calculated, the system starts up the classifier at the outputs, which are already there, and the outputs are used to calculate the error, adjust the weights, and then go to the previous layer and perform the same operations. That is, during back propagation, the error is determined, the weights are adjusted based on the error, and using the instruction stream the weights are sent out of the hardware back into memory. Thereafter, when forward propagating, all the new weights are available.

Figure 5:
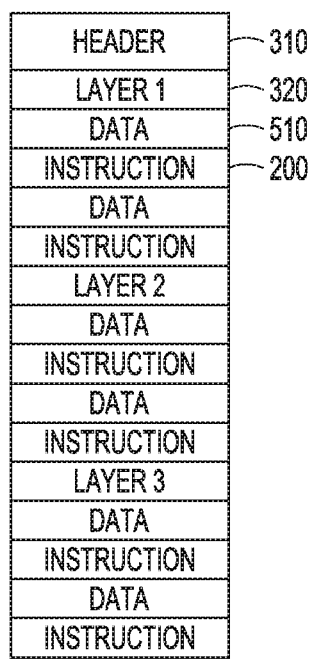
FIG. 5 is an illustration of an instruction stream for implementing backward propagation in an artificial neural network.

In the case of training a neural network via back propagation, the outputs of every layer must be retained. This retention cannot be done in restricted hardware environments because there is not enough memory to store all the output data. Consequently, during forward propagation, the STORE command is used to transmit the output of a perceptron in a layer to memory. When the back propagation is executed, the needed input data must be retrieved from memory for processing by the processing element. For this purpose, as illustrated in FIG. 5, every instruction is preceded by data 510. Consequently, for back propagation, the processing element needs the input value, the weight value, and the previous output value, which are all included in the instruction 510. While this does increase the size of the instruction stream, and slightly slows processing, it does allow for on-chip training of the neural network in hardware.

Figure 6:
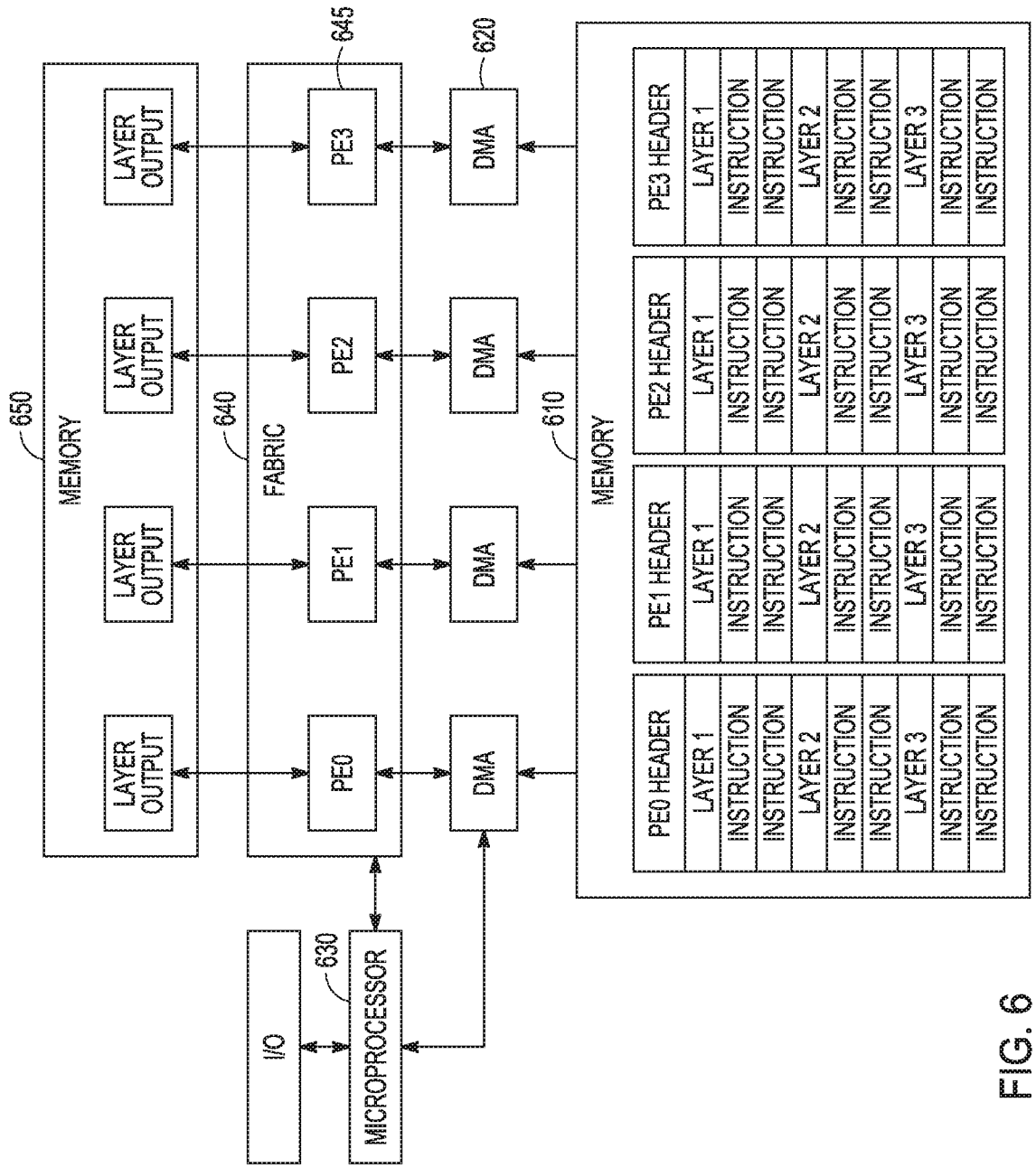
FIG. 6 is a block diagram illustrating a computer architecture for implementing a forward propagation in an artificial neural network.

Referring to FIG. 6, an embodiment of hardware architecture is illustrated. The streamed instructions for forward propagation are located in an memory 610. A direct memory access module 620 is used to access the instruction streams. The microprocessor 630 in conjunction with the direct memory access modules 620 access the instruction streams, and these instruction streams are transferred into the fabric 640 and processed by the processing elements 645. The microprocessor instructs the DMA to transfer data from one location to another, and the DMA simply transfers the data as a big block of memory into the fabric. After processing by the processing elements, the data are stored in memory 650 via the STORE command.

Figure 7:
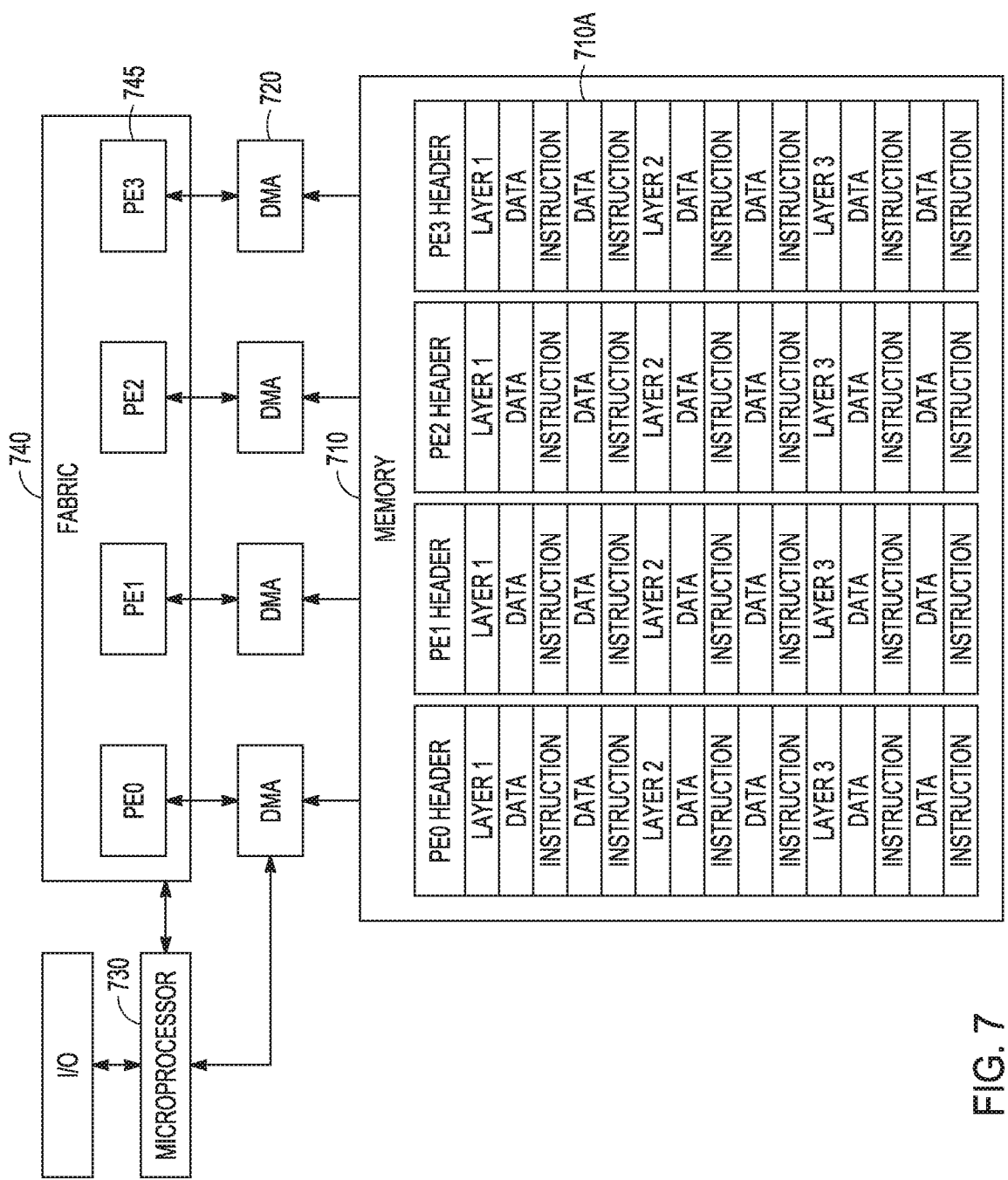
FIG. 7 is a block diagram illustrating a computer architecture for implementing a backward propagation in an artificial neural network.
Figure 8:
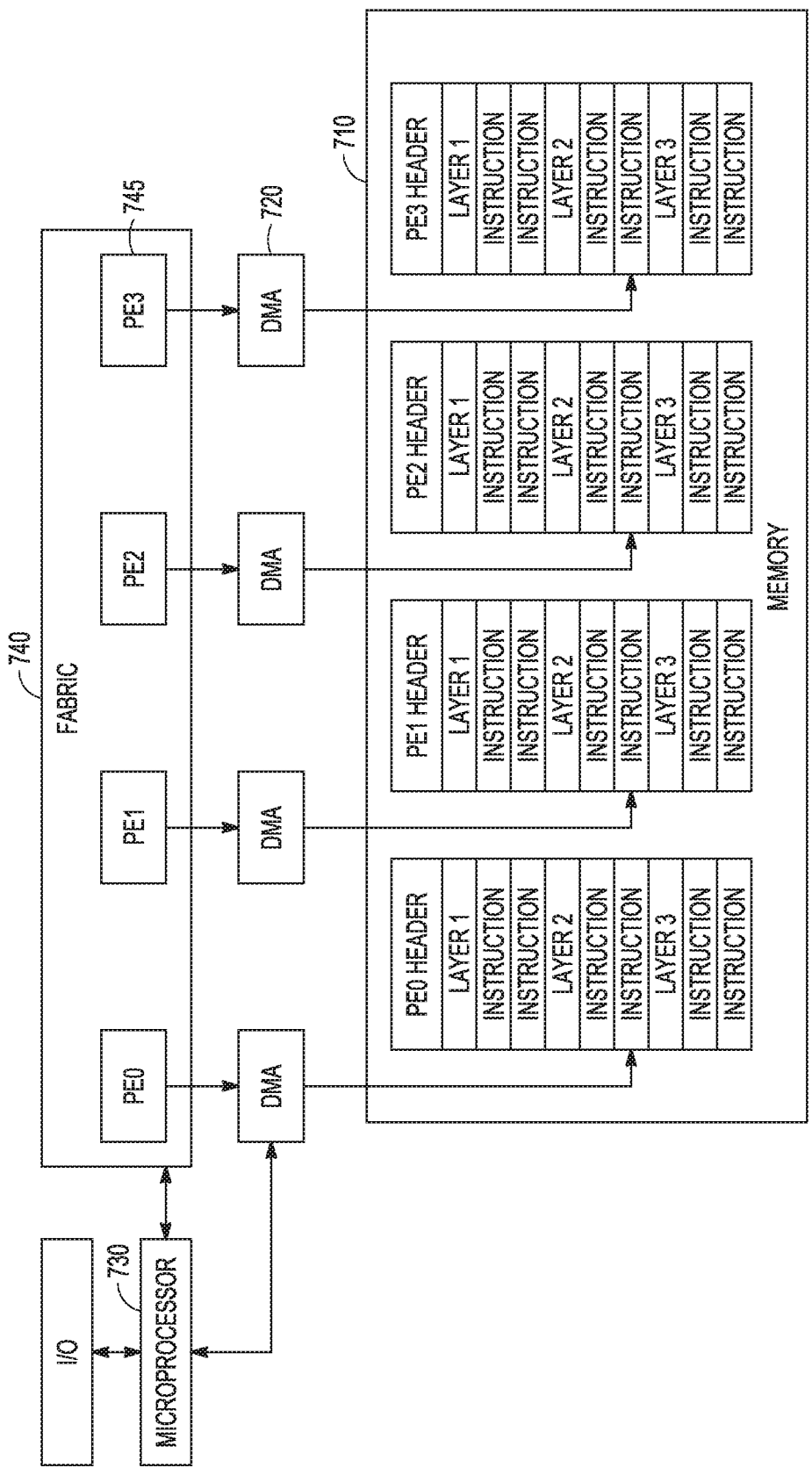
FIG. 8 is another block diagram illustrating a computer architecture for implementing a backward propagation in an artificial neural network.

Referring to FIG. 7, the streamed instructions for backward propagation are located in memory 710. It is noted that unlike the forward propagation of FIG. 6, the backward propagation has the needed data 710A. The microprocessor 730 in conjunction with the direct memory access modules 720 access the instruction streams, and these instruction streams are transferred into the fabric 740 and processed by the processing elements 745. Once again, the microprocessor instructs the DMA to transfer data from one location to another, and the DMA simply transfers the data as a big block of memory into the fabric. After the calculation of the error, the error is applied to the weight to adjust the weight, and the weight is stored back into memory. FIG. 8 illustrates how the updated weights are moved through the DMA 720 back to their original locations in the forward propagation instruction stream.

Figure 9:
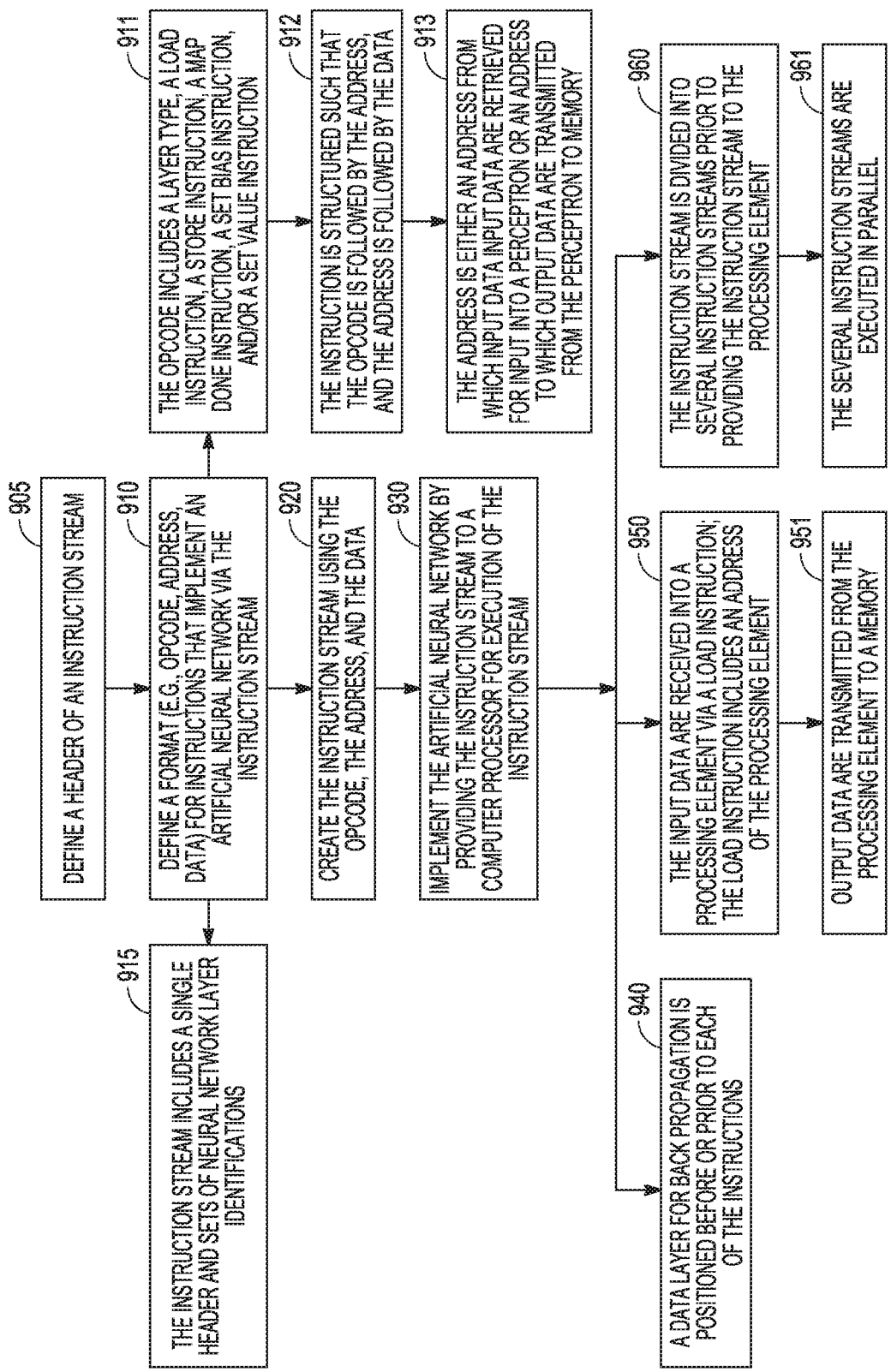
FIG. 9 is a block diagram illustrating operations and features of implementing an artificial neural network via an instruction stream.

FIG. 9 is another diagram illustrating a system and process for implementing an artificial neural network via an instruction stream according to some aspects of the embodiments. FIG. 9 includes process blocks 905-961. Though arranged substantially serially in the example of FIG. 9, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 9, at 905, a header of the instruction stream is defined. The header can include a learning rate and activation function parameters. At 910, a format is defined for instructions that implement an artificial neural network via an instruction stream. In an embodiment, the format includes an opcode, an address, and data. As indicated at 911, the opcode can include a layer type, a load instruction, a store instruction, a map done instruction, a set bias instruction (which indicates the beginning of processor element calculations), and/or a set value instruction. As indicated at 912, in an embodiment, the instruction is structured such that the opcode is followed by the address, and the address is followed by the data. As further indicated at 913, in an embodiment, the address is either an address from which input data are retrieved for input into a perceptron of the artificial neural network, or an address to which output data are transmitted from the perceptron of the artificial neural network.

As indicated at 915, the instruction stream can include a single header and sets of neural network layer identifications. In the neural network layer identifications, each neural network layer identification is associated with one or more instructions. (See e.g., FIG. 3).

After the defining of the format at operation 910, the instruction stream is created using the opcode, the address, and the data (920). Thereafter, at 930, the artificial neural network is implemented by providing the instruction stream to a computer processor for execution of the instruction stream.

In a particular embodiment, as illustrated in FIG. 5 and indicated at 940, a data layer is positioned before or prior to each of the instructions. As disclosed in connection with FIG. 5, this data layer is for use in connection with a backward propagation of the neural network.

As indicated at 950, the system includes a processing element. The input data are received into the processing element via a LOAD instruction, and the LOAD instruction includes an address field that indicates the neuron in the current layer to which the instruction is applied. As indicated at 951, output data are transmitted from the processing element to an memory.

At 960, the instruction stream is divided into several instruction streams prior to providing the instruction stream to the computer processor or processing element for execution. Then at 961, the several instruction streams are executed in parallel.

Figure 10:
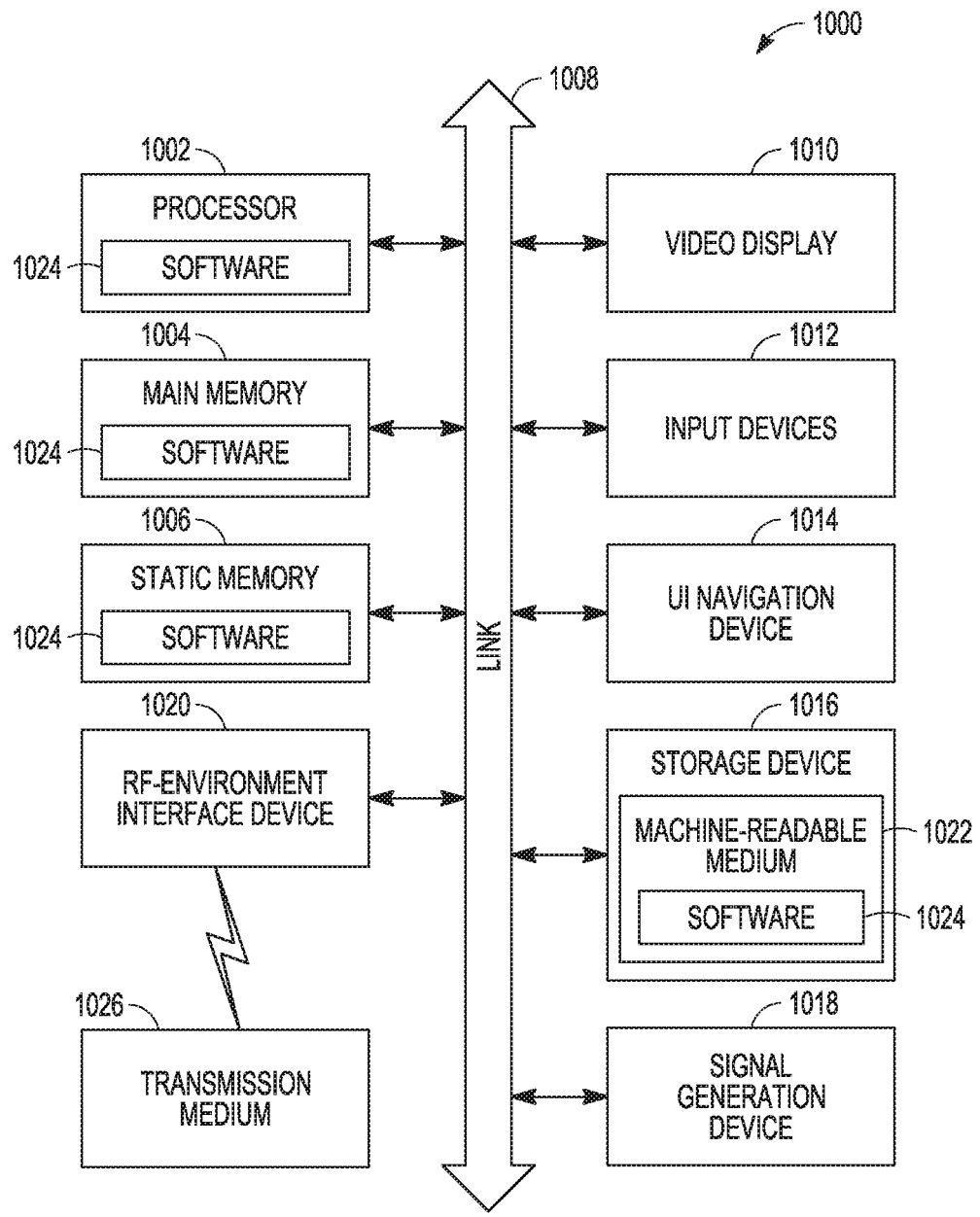
FIG. 10 is a block diagram illustrating a general computer architecture upon which one or more of the embodiments disclosed herein can execute.

FIG. 10 is a block diagram illustrating a computing and communications platform 1000 in the example form of a general-purpose machine on which some or all of the system of FIG. 1 may be carried out according to various embodiments. In certain embodiments, programming of the computing platform 1000 according to one or more particular algorithms produces a special-purpose machine upon execution of that programming. In a networked deployment, the computing platform 1000 may operate in the capacity of either a server or a client machine in server-client network environments, or it may act as a peer machine in peer-to-peer (or distributed) network environments.

Example computing platform 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computing platform 1000 may further include a video display unit 1010, input devices 1012 (e.g., a keyboard, camera, microphone), and a user interface (UI) navigation device 1014 (e.g., mouse, touchscreen). The computing platform 1000 may additionally include a storage device 1016 (e.g., a drive unit), a signal generation device 1018 (e.g., a speaker), and a RF-environment interface device (RFEID) 1020.

The storage device 1016 includes a non-transitory machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computing platform 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

RFEID 1020 includes radio receiver circuitry, along with analog-to-digital conversion circuitry, and interface circuitry to communicate via link 1008 according to various embodiments. Various form factors are contemplated for RFEID 1020. For instance, RFEID may be in the form of a wideband radio receiver, or scanning radio receiver, that interfaces with processor 1002 via link 1008. In one example, link 1008 includes a PCI Express (PCIe) bus, including a slot into which the NIC form-factor may removably engage. In another embodiment, RFEID 1020 includes circuitry laid out on a motherboard together with local link circuitry, processor interface circuitry, other input/output circuitry, memory circuitry, storage device and peripheral controller circuitry, and the like. In another embodiment, RFEID 1020 is a peripheral that interfaces with link 1008 via a peripheral input/output port such as a universal serial bus (USB) port. RFEID 1020 receives RF emissions over wireless transmission medium 1026. RFEID 1020 may be constructed to receive RADAR signaling, radio communications signaling, unintentional emissions, or some combination of such emissions.

Examples, as described herein, may include, or may operate on, logic or a number of components, circuits, or engines, which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as an engine. In an example, the whole or part of one or more computing platforms (e.g., a standalone, client or server computing platform) or one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor configured using software; the general-purpose hardware processor may be configured as respective different engines at different times. Software may accordingly configure a hardware processor, for example, to constitute a particular engine at one instance of time and to constitute a different engine at a different instance of time.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A process for implementing an artificial neural network via an instruction stream comprising:
defining a format for instructions in the instruction stream, the format comprising an opcode, an address, and data;
defining a header of the instruction stream, the header comprising a learning rate and activation function parameters;
creating the instruction stream using the opcode, the address, and the data;
creating the instruction stream using the header; and implementing the artificial neural network by providing the instruction stream to a computer processor for execution of the instruction stream;

wherein the opcode comprises one or more of a layer type, a load instruction, a store instruction, a map done instruction, a set bias instruction, and a set value instruction; and wherein the address comprises one or more of an address from which to retrieve input data for input into a perceptron of the artificial neural network and an address to transmit output data from the perceptron of the artificial neural network.

2. The process of claim 1, wherein the instruction stream comprises a single header and one or more sets of a neural network layer identifications; and wherein each neural network layer identification is associated with one or more instructions.

3. The process of claim 1, comprising a data layer positioned prior to each of the instructions; wherein the data layer is for use in connection with a backward propagation.

4. The process of claim 1, wherein the computer processor comprises a processing element; wherein the input data are received into the processing element via the load instruction; and wherein the load instruction comprises an address of the computer processor processing element.

5. The process of claim 4, wherein the output data are transmitted from t processing element to a memory.

6. The process of claim 1, comprising dividing the instruction stream into a plurality of instruction streams prior to providing the instruction stream to the computer processor.

7. The process of claim 6, wherein the plurality of instruction streams is executed in parallel.

8. The process of claim 1, wherein the instructions comprise the opcode, wherein the opcode is followed by the address, and wherein the address is followed by the data.

9. A non-transitory computer-readable medium comprising instructions that when executed by a processor execute a process for implementing an artificial neural network via an instruction stream, the process comprising:

defining a format for instructions in the instruction stream, the format comprising an opcode, an address, and data;

defining a header of the instruction stream, the header comprising a learning rate and activation function parameters; and instructions;

creating the instruction stream using the opcode, the address, and the data;

creating the instruction stream using the header; and implementing the artificial neural network by providing the instruction stream to a computer processor for execution of the instruction stream;

wherein the opcode comprises one or more of a layer type, a load instruction, a store instruction, a map done instruction, a set bias instruction, and a set value instruction; and wherein the address comprises one or more of an address from which to retrieve input data for input into a perceptron of the artificial neural network and an address to transmit output data from the perceptron of the artificial neural network.

10. The non-transitory computer-readable medium of claim 9, wherein the instruction stream comprises a single header and one or more sets of a neural network layer identifications; and wherein each neural network layer identification is associated with one or more instructions.

11. The non-transitory computer-readable medium of claim 9, comprising a data layer positioned prior to each of the instructions; wherein the data layer is for use in connection with a backward propagation.

12. The non-transitory computer-readable medium of claim 9, wherein the computer processor comprises a processing element; wherein the input data are received into the processing element via the load instruction; and wherein the load instruction comprises an address of the computer processor processing element.

13. The non-transitory computer-readable medium of claim 12, wherein the output data are transmitted from the processing element to a memory.

14. The non-transitory computer readable medium of claim 9, comprising instructions for dividing the instruction stream into a plurality of instruction streams prior to providing the instruction stream to the computer processor.

15. The non-transitory computer-readable medium of claim 14, wherein the plurality of instruction streams is executed in parallel.

16. The non-transitory computer-readable medium of claim 9, wherein the instructions comprise the opcode, wherein the opcode is followed by the address, and wherein the address is followed by the data.

17. A system comprising:

a computer processor; and a computer memory coupled to the computer processor;

wherein the computer processor is operable for implementing an artificial neural network via an instruction stream by:

defining a format for instructions in the instruction stream, the format comprising an opcode, an address, and data;

defining a header of the instruction stream, the header comprising a learning rate and activation function parameters;

creating the instruction stream using the opcode, the address, and the data;

creating the instruction stream using the header; and implementing the artificial neural network by providing the instruction stream to a computer processor for execution of the instruction stream;

wherein the opcode comprises one or more of a layer type, a load instruction, a store instruction, a map done instruction, a set bias instruction, and a set value instruction; and wherein the address comprises one or more of an address from which to retrieve input data for input into a perceptron of the artificial neural network and an address to transmit output data from the perceptron of the artificial neural network.

* * * * *

UNITED STATES PATENT AND TRADEMARK OFFICE
CERTIFICATE OF CORRECTION

| | |
|---|---|
| PATENT NO. | : 11,475,311 B2 |
| APPLICATION NO. | : 16/668957 |
| DATED | : October 18, 2022 |
| INVENTOR(S) | : Mixter et al. |

It is certified that error appears in the above-identified patent and that said Letters Patent is hereby corrected as shown below:

In the Specification

In Column 3, Line 6, delete "op code" and insert --opcode-- therefor

In Column 3, Line 7, delete "op code" and insert --opcode-- therefor

In Column 3, Line 9, delete "op code" and insert --opcode-- therefor

In Column 3, Line 20, delete "op code" and insert --opcode-- therefor

In the Claims

In Column 9, Line 27, in Claim 5, delete "t" and insert --the-- therefor

Signed and Sealed this
First Day of October, 2024

Katherine Kelly Vidal
*Director of the United States Patent and Trademark Office*